(12) United States Patent
Kim

(10) Patent No.: US 11,370,493 B2
(45) Date of Patent: Jun. 28, 2022

(54) VEHICLE BODY ROOF STRUCTURE

(71) Applicants: HYUNDAI MOTOR COMPANY, Seoul (KR); KIA MOTORS CORPORATION, Seoul (KR)

(72) Inventor: Do Hoi Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/156,870

(22) Filed: Jan. 25, 2021

(65) Prior Publication Data

US 2022/0048575 A1 Feb. 17, 2022

(30) Foreign Application Priority Data

Aug. 14, 2020 (KR) .......................... 10-2020-0102360

(51) Int. Cl.
*B62D 23/00* (2006.01)
*B62D 25/06* (2006.01)
*B62D 27/02* (2006.01)
*B62D 25/04* (2006.01)

(52) U.S. Cl.
CPC ............ *B62D 23/005* (2013.01); *B62D 25/04* (2013.01); *B62D 25/06* (2013.01); *B62D 27/02* (2013.01)

(58) Field of Classification Search
CPC .................................................. B62D 23/005

USPC ........................................................ 296/205
See application file for complete search history.

(56) References Cited

U.S. PATENT DOCUMENTS

| | | | | | |
|---|---|---|---|---|---|
| 2,389,907 | A | * | 11/1945 | Helmuth | B62D 23/005 29/469 |
| 5,458,393 | A | * | 10/1995 | Benedyk | B62D 27/023 280/798 |
| 6,702,368 | B1 | * | 3/2004 | Hanyu | B62D 25/04 296/193.06 |
| 2007/0281523 | A1 | * | 12/2007 | Riley | B62D 27/026 439/157 |
| 2017/0355003 | A1 | * | 12/2017 | TenHouten | B21D 7/12 |

FOREIGN PATENT DOCUMENTS

| | | | | |
|---|---|---|---|---|
| CN | 101720292 A | * | 6/2010 | ........... B62D 23/005 |
| KR | 10-2014-0091510 A | | 7/2014 | |

* cited by examiner

*Primary Examiner* — Dennis H Pedder
(74) *Attorney, Agent, or Firm* — Morgan, Lewis & Bockius LLP

(57) ABSTRACT

A vehicle body roof includes: a plurality of assembly rails spaced apart from each other in the lateral direction of the vehicle and extending in a forward-backward direction; a first roof rail disposed between the assembly rails; the first roof rail extending in the lateral direction toward the assembly rails and detachably mounted to the assembly rails; and a second roof rail extending in a predetermined shape according to a type of vehicle body and detachably mounted at an end portion thereof to an end portion of each of the assembly rails.

11 Claims, 13 Drawing Sheets

VEHICLE BODY ROOF STRUCTURE

CROSS-REFERENCE TO THE RELATED APPLICATION

This application claims the benefit of priority to Korean Patent Application No. 10-2020-0102360, filed on Aug. 14, 2020, in the Korean Intellectual Property Office, the disclosure of which is incorporated herein by reference in its entirety.

TECHNICAL FIELD

The present disclosure relates to a vehicle body roof that is capable of being easily designed and manufactured to correspond to various types of vehicle bodies.

BACKGROUND

When a conventional monocoque-type vehicle body is designed, a plurality of mold parts is combined. The monocoque-type vehicle body exhibits excellent rigidity, but it is very difficult to implement vehicles having various designs or to use portions thereof in common in different types of vehicles using the monocoque design technique.

In the conventional monocoque structure, it is possible to design the entire front pillar using a single draw mold for an inner member and an outer member. However, the monocoque structure is not readily adaptable for connection with other parts, and it is required to develop a new mold for each vehicle design.

In the case of a small-quantity batch production system or a production system using a smart factory, frequent design changes are required, and accordingly, the number of molds drastically increases, leading to high production costs.

Therefore, there is need for a vehicle body or a pillar structure having a new structure capable of securing excellent rigidity and high adaptability for connection with other parts while overcoming the above disadvantages of the conventional art.

The information disclosed in this Background of the Disclosure section is only for enhancement of understanding of the general background of the disclosure and should not be taken as an acknowledgement or any form of suggestion that this information forms the related art already known to a person skilled in the art.

SUMMARY

The present disclosure has been made in view of the above problems, and it is an object of the present disclosure to provide a vehicle body roof that facilitates connection between parts constituting the vehicle body roof and replacement thereof, exhibits high compatibility between the parts, and secures assembly rigidity.

In accordance with the present disclosure, the above and other objects can be accomplished by the provision of a vehicle body roof including: a plurality of assembly rails spaced apart from each other in a lateral direction of a vehicle and extending in a forward-backward direction; a first roof rail disposed between the plurality of assembly rails, the first roof rail extending in the lateral direction toward the plurality of assembly rails and detachably mounted to the plurality of assembly rails; and a second roof rail extending in a predetermined shape according to a type of vehicle body and detachably mounted at an end portion thereof to an end portion of each of the plurality of assembly rails.

The vehicle body roof may further include a pillar rail disposed under each of the plurality of assembly rails. The pillar rail may extend in an upward-downward direction and is detachably mounted to the first roof rail.

The pillar rail may include a pair of side wall portions extending in the upward-downward direction and disposed opposite each other in the forward-backward direction and an outer side portion connecting the pair of side wall portions.

The pillar rail may include a contact portion extending from the upper end of the outer side portion and surrounding an outer side surface of each of the plurality of assembly rails. The contact portion may be mounted to each of the plurality of assembly rails by fastening bolts or rivets thereto in the state in which the contact portion is in contact with and surrounds each of the plurality of assembly rails.

Each of the plurality of assembly rails or the second roof rail may include a fastening portion extending downwards therefrom so as to be in contact with the side wall portions of the pillar rail. The side wall portions may be mounted to the fastening portion by fastening bolts or rivets thereto in the state in which the side wall portions are aligned with the fastening portion.

Each of the plurality of assembly rails may include a rail groove formed in an inner side surface thereof, facing the first roof rail, so as to extend in the forward-backward direction. The first roof rail may include a flange portion formed at a respective end portion thereof so as to extend in the forward-backward direction. The flange portion may be provided with a sliding portion protruding therefrom so as to be inserted into the rail groove.

The flange portion of the first roof rail may be secured to each of the plurality of assembly rails by fastening bolts or rivets thereto in the state in which the sliding portion is slidably mounted in the rail groove.

The second roof rail may be provided in a plural number. The vehicle body roof may further include a support rail disposed between the second roof rails and extending in the lateral direction toward the second roof rails so as to be connected to the second roof rails.

The support rail may be formed to have a rectangular-shaped cross-section having one open side and to have both ends that are bent outwards.

Each of the second roof rails may be provided with a fixing part on which the support rail is seated, and the support rail may be coupled to each of the second roof rails via the fixing part in a manner such that the support rail is bolted to the fixing part in the state of being seated on the fixing part.

A fitting portion may be formed at an end portion of each of the plurality of assembly rails so as to protrude in the direction in which the plurality of assembly rails extends, and an insertion portion may be formed at an end portion of each of the second roof rails, facing the end portion of a respective one of the plurality of assembly rails, so as to be inserted into the fitting portion.

The fitting portion and the insertion portion may be formed to have the same cross-sectional shape. The fitting portion and the insertion portion may be secured to each other by fastening bolts or rivets thereto at plural positions on the circumferences thereof in the state in which the insertion portion is inserted into the fitting portion.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, a vehicle body roof according to exemplary embodiments of the present disclosure will be described with reference to the accompanying drawings.

Figure 1:
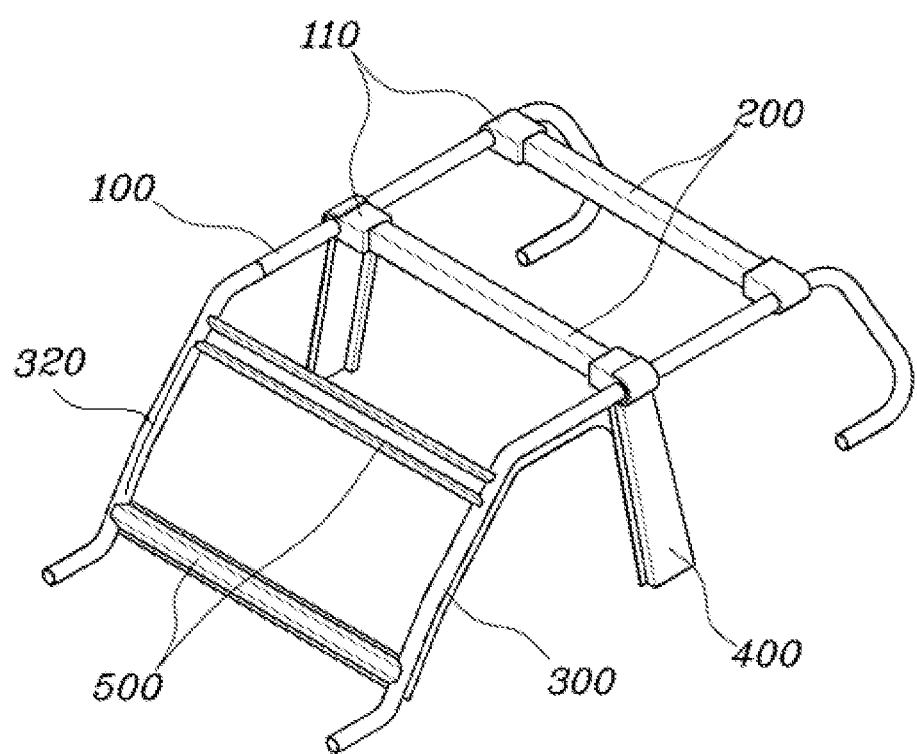
FIG. 1 is a view showing a vehicle body roof according to the present disclosure.
Figure 2:
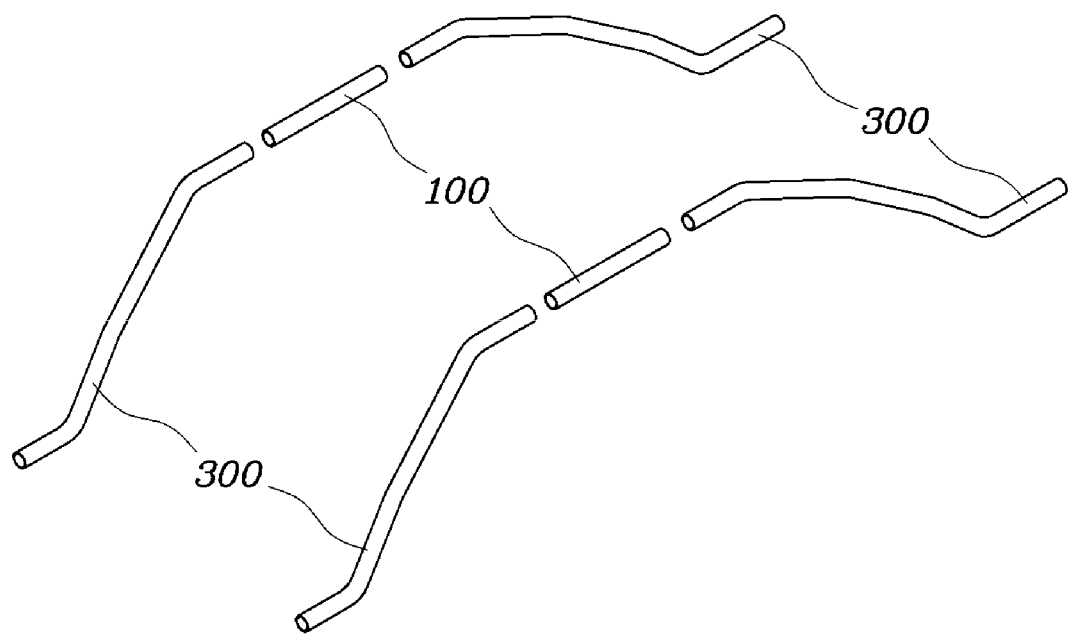
FIG. 2 is a view showing an embodiment of a second roof rail.
Figure 3:
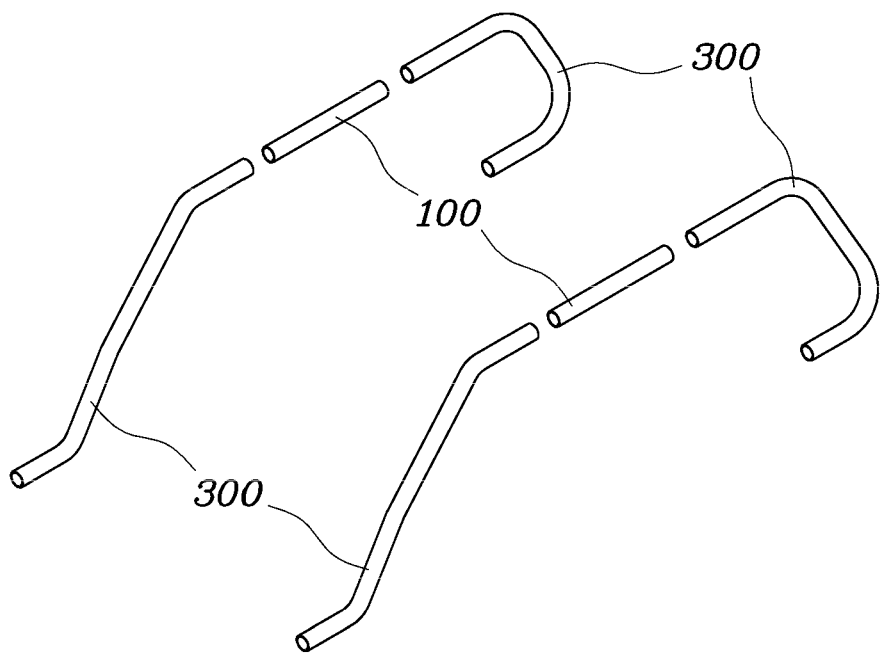
FIG. 3 is a view showing another embodiment of the second roof rail.
Figure 4:
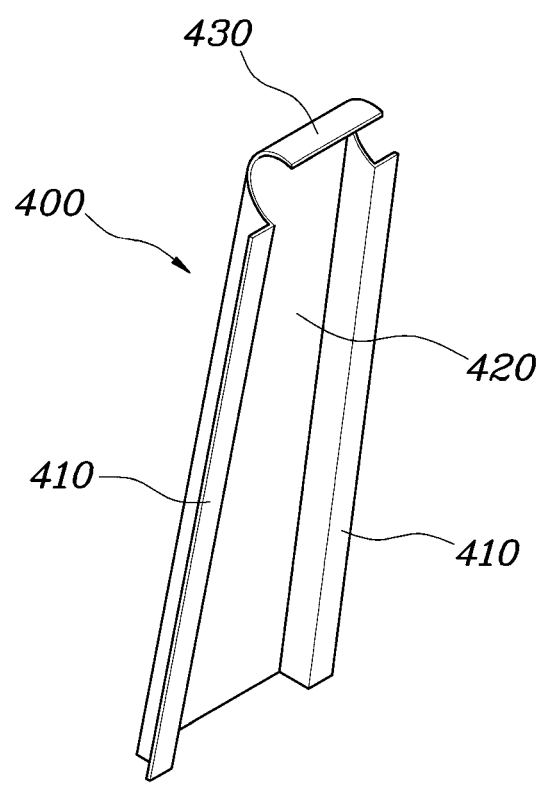
FIG. 4 is a view showing a pillar rail.
Figure 5:
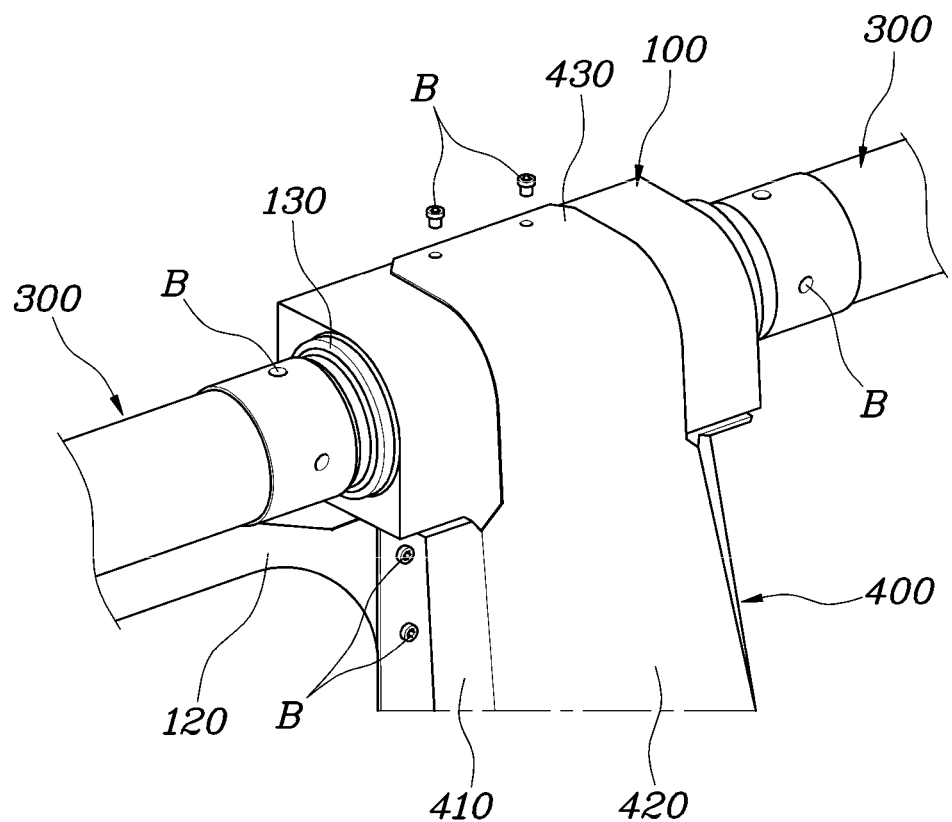
FIGS. 5 and 6 are views showing the installation of an assembly rail and the pillar rail.
Figure 6:
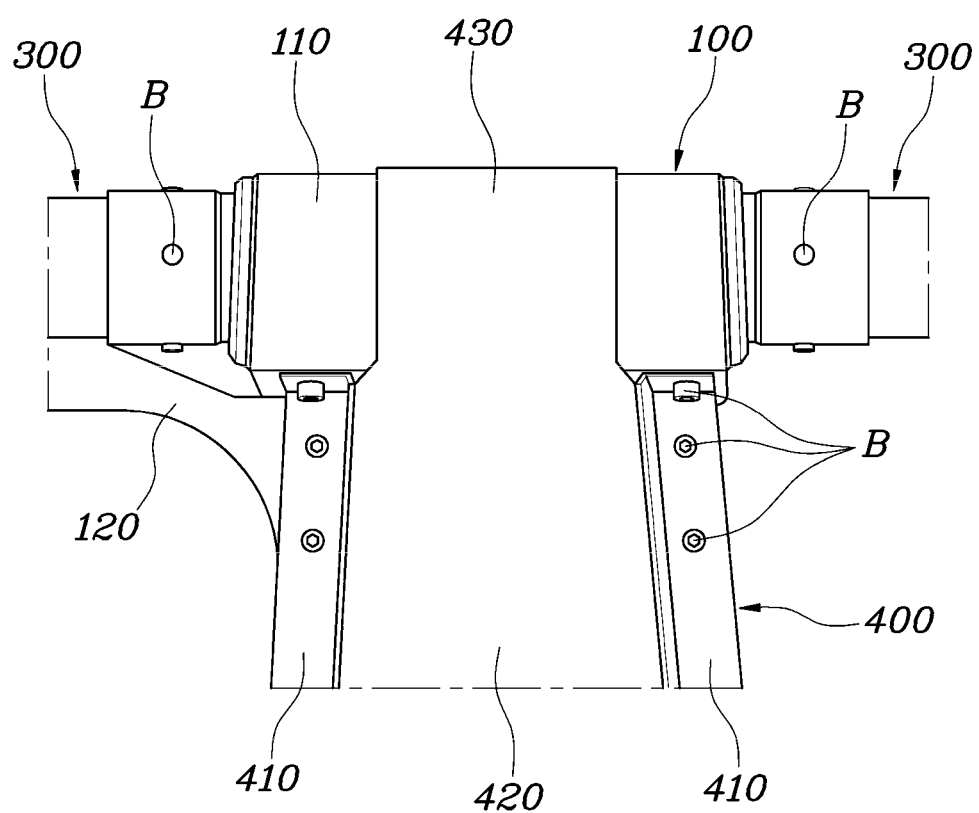
Figure 7:
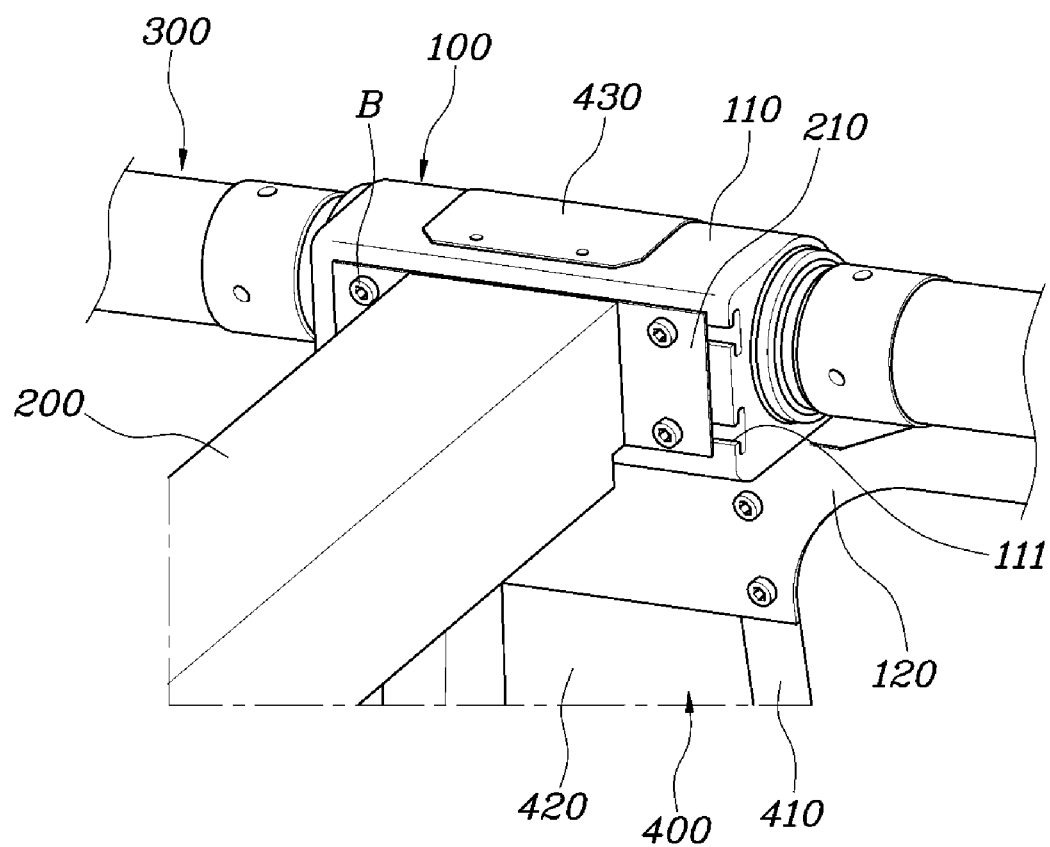
FIG. 7 is a view showing the installation of the assembly rail and a first roof rail.
Figure 8:
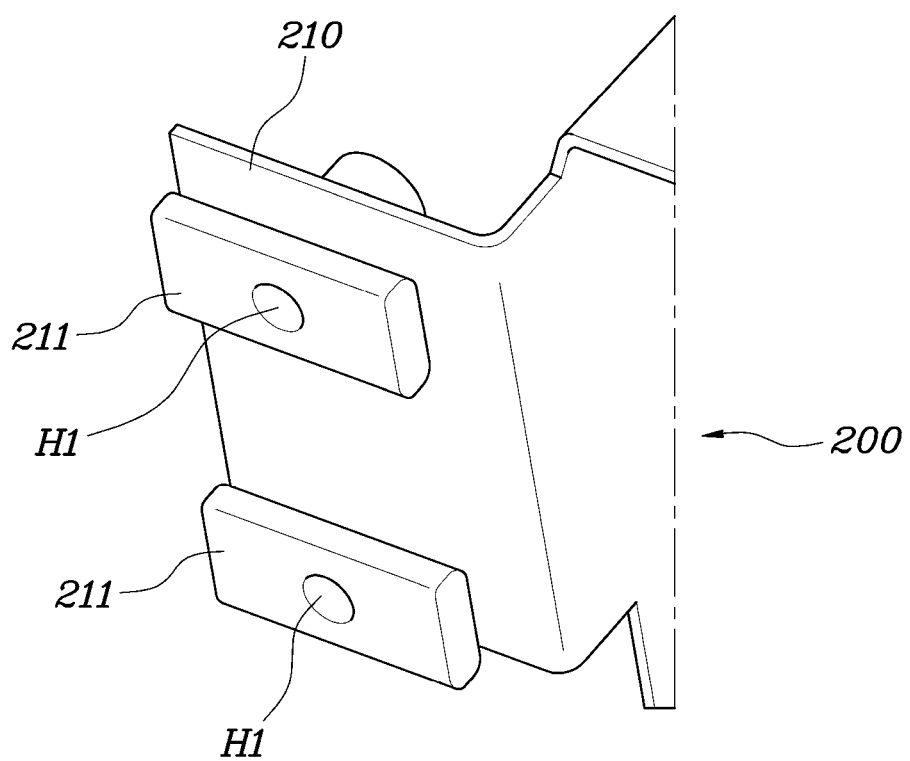
FIGS. 8 to 10 are views for explaining the installation of the assembly rail and the first roof rail.
Figure 9:
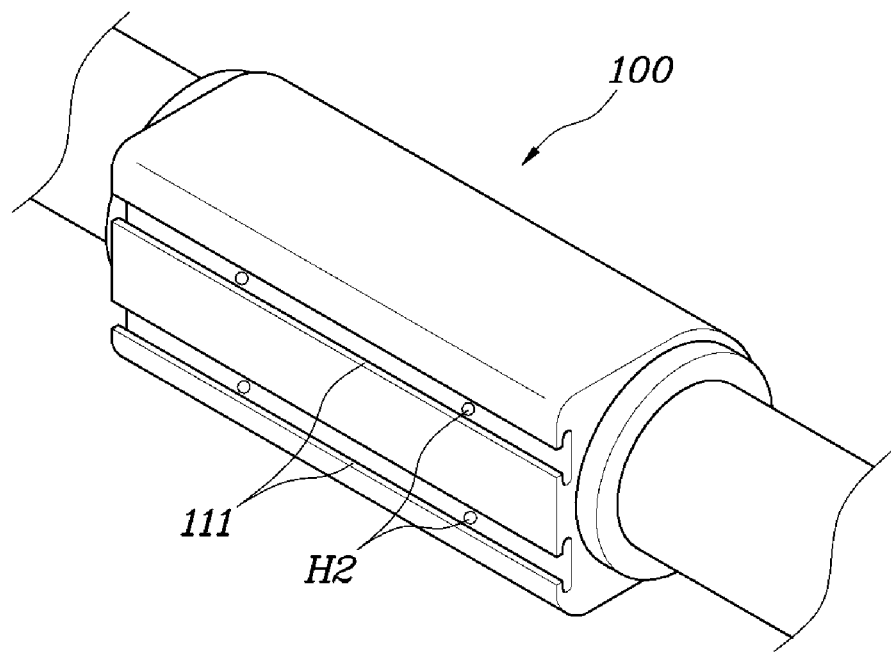
Figure 10:
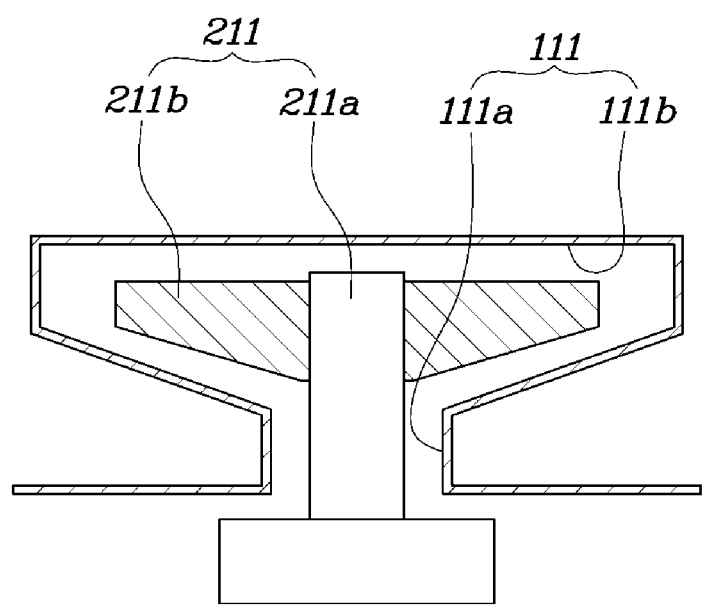
Figure 11:
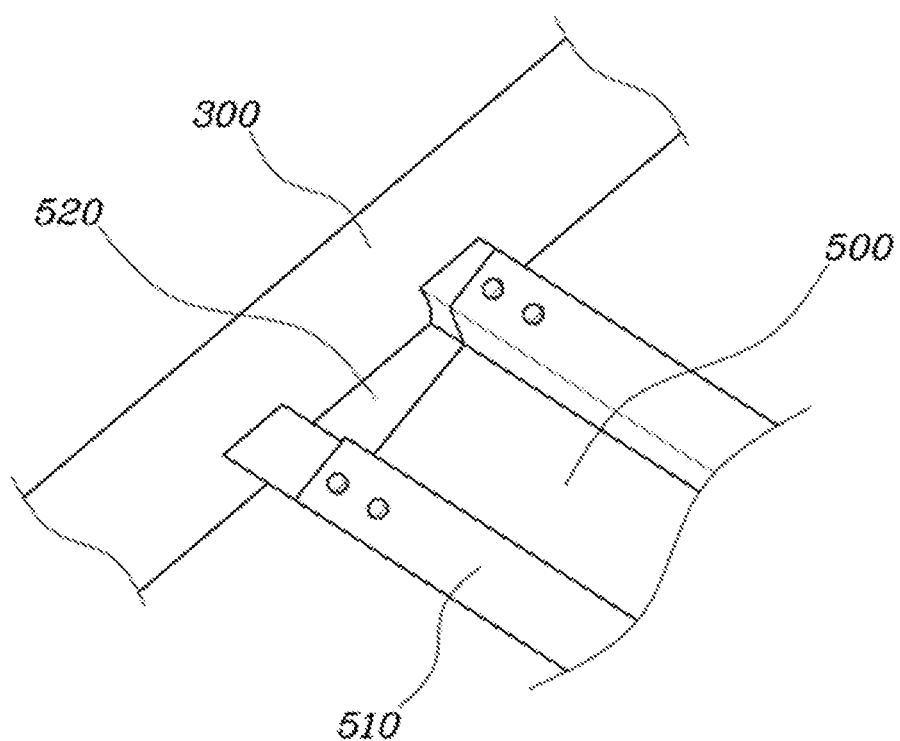
FIG. 11 is a view for explaining the installation of the assembly rail and a support rail.
Figure 12:
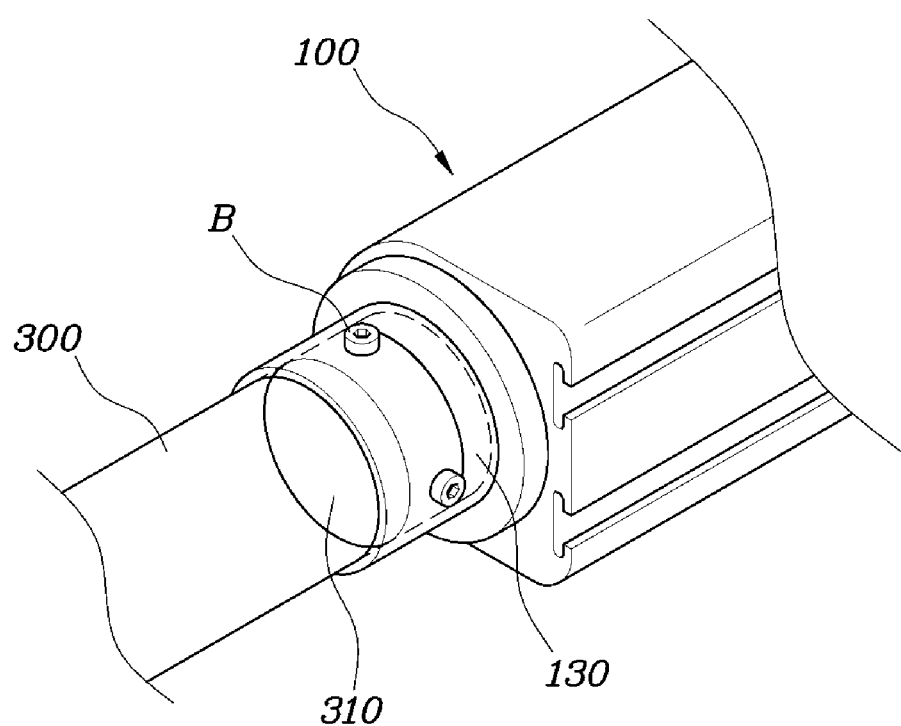
FIGS. 12 to 14 are views for explaining the installation of the assembly rail and the second roof rail.
Figure 13:
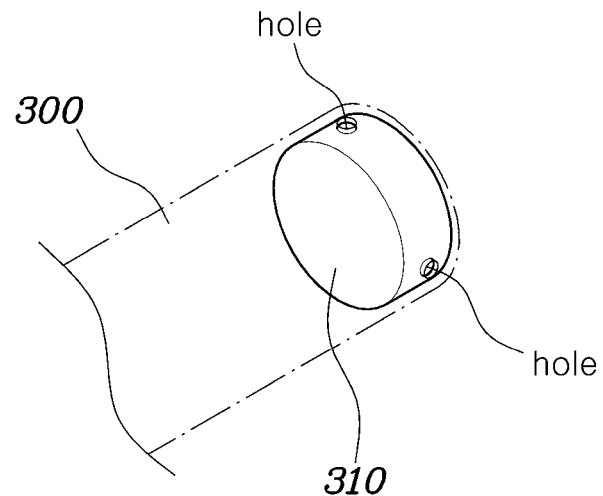
Figure 14:
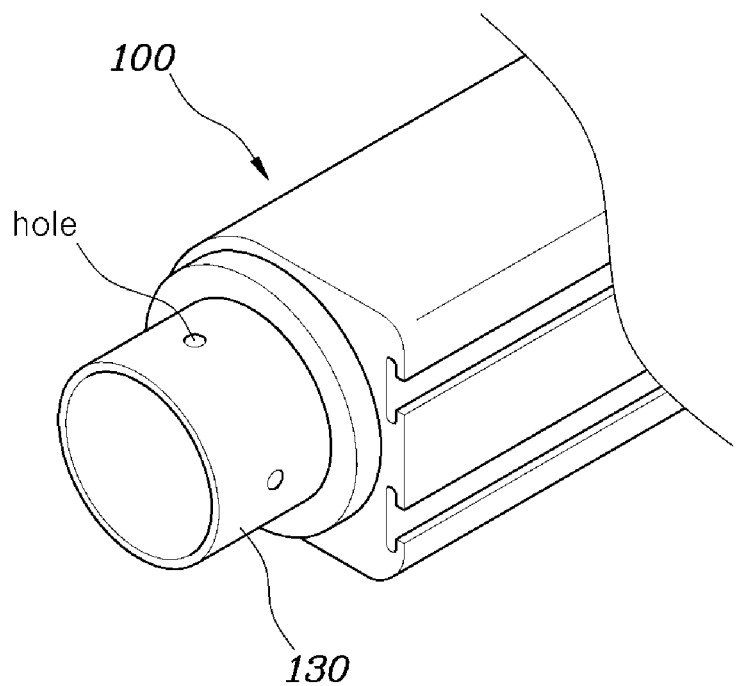

FIG. 1 is a view showing a vehicle body roof according to the present disclosure, FIG. 2 is a view showing an embodiment of a second roof rail, FIG. 3 is a view showing another embodiment of the second roof rail, FIG. 4 is a view showing a pillar rail, FIGS. 5 and 6 are views showing the installation of an assembly rail and the pillar rail, FIG. 7 is a view showing the installation of the assembly rail and a first roof rail, FIGS. 8 to 10 are views for explaining the installation of the assembly rail and the first roof rail, FIG. 11 is a view for explaining the installation of the assembly rail and a support rail, and FIGS. 12 to 14 are views for explaining the installation of the assembly rail and the second roof rail.

As shown in FIG. 1, a vehicle body roof according to the present disclosure includes a plurality of assembly rails 100, which are spaced apart from each other in the lateral direction of the vehicle and extend in a forward-backward direction, a first roof rail 200, which is disposed between the assembly rails 100, extends in the lateral direction toward the assembly rails 100, and is detachably mounted to the assembly rails 100, and a second roof rail 300, which extends in a specific shape according to the type of vehicle body and is detachably mounted at an end portion thereof to an end portion of each of the assembly rails 100. A plurality of assembly rails 100 may be disposed in the forward-backward direction depending on the type of the vehicle body.

Parts constituting the vehicle body roof according to the present disclosure are connected to each other using a plurality of joints. The vehicle body roof is connected to a vehicle body floor forming the bottom of the vehicle body and to various parts so as to form the vehicle body.

In the vehicle body roof of the present disclosure, the assembly rails 100 extending in the forward-backward direction are provided in a pair thereof, and are disposed so as to be spaced apart from each other in the lateral direction. The assembly rails 100 may be connected with other parts, and may be provided therein with a reinforcing material 110 to ensure rigidity.

The pair of assembly rails 100 is connected via the first roof rail 200. The first roof rail 200 is detachably mounted to the assembly rails 100, and may be changed in shape in accordance with the type of the vehicle body. Each of the assembly rails 100, the first roof rail 200, and the second roof rail 300 may be formed to have a hollow closed cross-section so as to secure the rigidity thereof, and may be made of a rigid material.

In this manner, the first roof rail 200 is connected to the assembly rails 100, and the second roof rail 300 is mounted to the end portion of each of the assembly rails 100. The second roof rail 300 has a specific shape depending on the type of the vehicle body. The second roof rail 300 may be coupled to the end portion of each of the assembly rails 100, and may be formed in any of various shapes depending on the type of the vehicle body. For example, in the case of a sedan-type vehicle body, the second roof rail 300 may be formed in the shape shown in FIG. 2, and in the case of a hatchback-type vehicle, the second roof rail 300 may be formed in the shape shown in FIG. 3. Additionally, the shape of the second roof rail 300 may be determined in consideration of various other types of vehicle bodies, e.g. a truck-type vehicle body or a bus-type vehicle body. In addition, the second roof rail 300 may have a glass support portion 320 for supporting a windshield glass. This configuration may be formed through laser or seam welding.

As shown in FIG. 4, the present disclosure further includes a pillar rail 400, which is disposed under the assembly rail 100, extends in an upward-downward direction, and is detachably mounted to the first roof rail 200. The pillar rail 400 includes a pair of side wall portions 410, which extend in the upward-downward direction and are disposed opposite each other in the forward-backward direction, and an outer side portion 420, which connects the pair of side wall portions 410. Thus, the pillar rail 400 is formed to have an open cross-section, thereby securing sufficient strength and rigidity. That is, the pillar rail 400 is composed of a pair of side wall portions 410 and an outer side portion 420 connecting the side wall portions 410, thereby having an open cross-section having one open side. Each of the side wall portions 410 may have an end portion that is bent and extends therefrom. The upper ends of the side wall portions 410 and the outer side portion 420 of the pillar rail 400 are in contact with the lower end of the assembly rail 100, thereby securing rigidity for supporting the assembly rail 100. In addition, the pillar rail 400 is also detachably mounted to the assembly rail 100, and is thus capable of being interchanged depending on the type of the vehicle body.

In this way, the first roof rail 200, the second roof rail 300, and the pillar rail 400 are mounted to the assembly rails 100 to form a vehicle body roof for a particular type of vehicle body. In addition, it is possible to implement various types of vehicle bodies by changing the lengths and the shapes of the above parts. In addition, the assembly rails 100, the first roof rail 200, the second roof rail 300, and the pillar rail 400 are detachably mounted to each other, and are capable of being used in common in different types of vehicle bodies. Accordingly, compatibility between the parts is improved, and thus it is possible to selectively change the type of the vehicle body.

Hereinafter, the mounting structure of the assembly rails 100, the first roof rail 200, the second roof rail 300, and the pillar rail 400 according to the present disclosure described above will be described.

As shown in FIGS. 4 to 6, the pillar rail 400 includes a contact portion 430, which extends from the upper end of the outer side portion 420 and surrounds the outer side surface of the assembly rail 100. The contact portion 430 may be mounted to the assembly rail 100 by fastening bolts or rivets B thereto in the state in which the contact portion 430 is in contact with the assembly rail 100 so as to surround the same.

In this way, the pillar rail 400 may be secured to the assembly rail 100 by fastening bolts or rivets B thereto in the state in which the upper ends of the outer side portion 420 and the side wall portions 410 of the pillar rail 400 are in contact with the lower end of the assembly rail 100 and in which the contact portion 430 extending from the upper end of the outer side portion 420 surrounds the assembly rail 100. Here, the contact portion 430 of the pillar rail 400, which extends from the upper end of the outer side portion 420, may smoothly extend upwards so as to surround the outer side surface and the upper surface of the assembly rail 100. The outer side surface and the upper surface of the assembly rail 100 may be formed to be curved, and the contact portion 430 may also be formed to be curved in the same shape as those of the outer side surface and the upper surface of the assembly rail 100 so as to come into surface contact therewith, thereby securing contact rigidity between the assembly rail 100 and the contact portion 430. The pillar rail 400 may be secured to the assembly rail 100 via the contact portion 430 by fastening bolts or rivets B thereto in the state in which the contact portion 430 is in contact with the assembly rail 100. Bolts or rivets B may be fastened through the upper surface of the assembly rail 100 and the contact portion 430. A plurality of bolts or rivets B may be fastened at a plurality of positions so as to secure sufficient fastening rigidity.

As shown in FIGS. 5 and 6, the assembly rail 100 or the second roof rail 300 has a fastening portion 120, which extends downwards therefrom and is in contact with the side wall portions 410 of the pillar rail 400. The side wall portions 410 are mounted to the fastening portion 120 by fastening bolts or rivets B thereto in the state in which the side wall portions 410 are aligned with the fastening portion 120.

The fastening portion 120 extends so as to be in contact with the side wall portions 410 of the pillar rail 400 mounted to the assembly rail 100. The side wall portions 410 are secured to the fastening portion 120 by fastening bolts or rivets B thereto in the state in which the side wall portions 410 are aligned with the fastening portion 120. The fastening portion 120 may be formed to extend from the assembly rail 100 or the second roof rail 300. The fastening portion 120 may extend from the second roof rail 300. In particular, the fastening portion 120 extends at an incline in an oblique direction from the second roof rail 300 toward the pillar rail 400 so as to further secure assembly rigidity between the second roof rail 300 and the pillar rail 400.

The fastening portion 120 may be integrally formed with the assembly rail 100 or the second roof rail 300. Alternatively, the fastening portion 120 may be provided separately from the assembly rail 100 or the second roof rail 300 so as to connect the pillar rail 400 to the assembly rail 100 or the second roof rail 300.

As shown in FIGS. 7 to 9, the assembly rail 100 has a rail groove 111 formed in the inner side surface thereof, which faces the first roof rail 200, so as to extend in the forward-backward direction. The first roof rail 200 has a flange portion 210 formed at a respective end portion thereof so as to extend in the forward-backward direction. The flange portion 210 has a sliding portion 211 protruding therefrom so as to be inserted into the rail groove 111.

The first roof rail 200 may be moved in the forward-backward direction and may be slidably assembled to the assembly rail 100. That is, since the rail groove 111 is formed in the assembly rail 100 in the forward-backward direction and the sliding portion 211 is formed at the flange portion 210 of the first roof rail 200 so as to be inserted into the rail groove 111, the first roof rail 200 may be slidably assembled to the assembly rail 100 in a manner such that the sliding portion 211 is moved in the rail groove 111. Since the first roof rail 200 has a closed cross-section in order to secure manufacturability and rigidity, the flange portion 210 may be formed at a respective end portion thereof so as to be bent and extend in the forward-backward direction, and the sliding portion 211 may be formed at the flange portion 210. In addition, as shown in FIG. 10, in order to prevent the sliding portion 211 from being separated from the rail groove 111, the rail groove 111 may be formed to have a recessed area 111a and a sliding area 111b that have different widths from each other. Similar to the shape of the rail groove 111, the sliding portion 211 may be formed to have an insertion section 211a and a sliding section 211b.

The flange portion 210 of the first roof rail 200 may be secured to the assembly rail 100 by fastening bolts or rivets B thereto in the state in which the sliding portion 211 is slidably mounted in the rail groove 111. That is, the first roof rail 200 may be secured to the assembly rail 100 by fastening bolts or rivets B thereto in the state in which the sliding portion 211 of the flange portion 210 is slidably assembled and provisionally fixed to the rail groove 111 in the assembly rail 100.

As shown in FIG. 8, holes H1, through which bolts or rivets B are fastened to the first roof rail 200, may be formed so as to penetrate both the flange portion 210 and the sliding portion 211. The rail groove 111 may also have therein holes H2, through which bolts or rivets B are fastened thereto. Accordingly, the flange portion 210 is secured to the assembly rail 100 by fastening bolts or rivets B into the holes H1 and H2 in the state in which the first roof rail 200 is slidably assembled and provisionally fixed to the assembly rail 100 and in which the holes H1 formed in the flange portion 210 and the sliding portion 211 are aligned with the holes H2 formed in the rail groove 111. In this manner, the first roof rail 200 may be secured to the assembly rail 100.

As shown in FIG. 1, the second roof rail 300 may be provided in a plural number, like the assembly rail 100. The present disclosure may further include a support rail 500 disposed between the second roof rails 300 and extending in the lateral direction toward the second roof rails 300 so as to be connected to the second roof rails 300.

In this manner, the second roof rail 300 may be provided in a plural number such that each of the second roof rails 300 is connected to a respective one of the assembly rails 100. The plurality of second roof rails 300 and the support rail 500 connecting the same may be integrated as a single assembly.

As shown in FIG. 11, the support rail 500 may be formed to have a rectangular-shaped cross-section having one open side and to have both ends that are bent outwards. That is, the support rail 500 may be formed to have a "["-shaped cross-section, and both ends of the open portion may be bent outwards to form flanges 510. As such, since the support rail 500 is formed to have an open cross-section, it is possible to secure sufficient rigidity and to prevent deformation such as bending.

In addition, the second roof rail 300 may be provided with a fixing part 520, on which the support rail 500 is seated. The support rail 500 may be bolted to the fixing part 520 in the state of being seated on the fixing part 520. That is, the support rail 500 may be coupled to the second roof rail 300 via the fixing part 520.

Specifically, the fixing part 520 may be coupled to the second roof rail 300 through laser welding or seam welding, and the support rail 500 may be bolted to the fixing part 520 in the state of being seated thereon. In this way, the support rail 500 may be securely coupled to the second roof rail 300. The fixing part 520 may extend in the direction in which the plurality of second roof rails 300 faces each other, and may be formed in the same shape as that of the support rail 500, so the support rail 500 may be stably seated on the fixing part 520. The fixing part 520 may extend a length that allows the end portion of the support rail 500 to be seated thereon. There may be further provided nuts so that the support rail 500 may be bolted to the fixing part 520 in the state of being seated thereon. As described above, the fixing part 520 is provided at each of the plurality of second roof rails 300, and the support rail 500 is coupled to the second roof rail 300 via the fixing part 520 so as to be integrated as a single assembly, so it is possible to easily mount the support rail 500 to the second roof rail 300.

As shown in FIGS. 12 to 14, a fitting portion 130 may be formed at an end portion of the assembly rail 100 so as to protrude in the direction in which the assembly rail 100 extends, and an insertion portion 310 may be formed at an end portion of the second roof rail 300, which faces the end portion of the assembly rail 100, so as to be inserted into the fitting portion 130. Accordingly, the assembly rail 100 and the second roof rail 300 are coupled to each other merely by inserting the insertion portion 310 into the fitting portion 130 in the forward-backward direction, thereby securing the assemblability between the assembly rail 100 and the second roof rail 300. Alternatively, the fitting portion 130 may be formed at the second roof rail 300, and the insertion portion 310 may be formed at the assembly rail 100. Further, each of the assembly rail 100 and the second roof rail 300 may be formed to have a hollow closed cross-section so that the fitting portion 130 is capable of being fitted through the assembly rail 100 and the insertion portion 310 is capable of being fitted into the end portion of the second roof rail 300. In this way, the assembly rail 100 may be provided with the fitting portion 130 and the second roof rail 300 may be provided with the insertion portion 310 by forming the assembly rail 100 and the second roof rail 300 and then fitting the fitting portion 130 and the insertion portion 310 into the hollow portions in the assembly rail 100 and the second roof rail 300, respectively.

The fitting portion 130 and the insertion portion 310 may be formed to have the same cross-sectional shape. The insertion portion 310 and the fitting portion 130 may be secured to each other by fastening bolts or rivets B thereto at plural positions on the circumferences thereof in the state in which the insertion portion 310 is inserted into the fitting portion 130. The fitting portion 130 and the insertion portion 310 may be formed in various shapes. The fitting portion 130 and the insertion portion 310 may have a circular-shaped cross-section in order to improve the assemblability therebetween. In this way, the fitting portion 130 and the insertion portion 310 are secured to each other by fastening bolts or rivets B thereto in the state in which the insertion portion 310 is inserted into the fitting portion 130 and thus the second roof rail 300 is provisionally fixed to the assembly rail 100. Each of the fitting portion 130 and the insertion portion 310 may have therein a plurality of holes into which bolts or rivets B are fastened. The holes may be arranged at regular angular intervals on the circumference of each of the fitting portion 130 and the insertion portion 310. The holes are arranged at regular angular intervals of 90° in order to improve assemblability and to secure assembly rigidity.

As described above, it is possible to implement various types of vehicle bodies by adjusting the lengths and the shapes of the assembly rails 100, the first roof rail 200, the second roof rail 300, the pillar rail 400, and the support rail 500 in accordance with a desired type of vehicle body. In addition, the assembly rail 100, the first roof rail 200, the second roof rail 300, the pillar rail 400, and the support rail 500 are capable of being easily used in common in different types of vehicle bodies. Accordingly, it is possible to more easily develop a new vehicle design and to effectively implement a small-quantity batch production system.

As is apparent from the above description, the present disclosure provides a vehicle body roof that facilitates connection between parts constituting the vehicle body roof and replacement thereof, exhibits high compatibility between the parts, and secures assembly rigidity.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A body roof of a vehicle, comprising:
a plurality of assembly rails spaced apart from each other in a lateral direction of the vehicle and extending in a forward-backward direction;
a first roof rail disposed between the plurality of assembly rails, the first roof rail extending in the lateral direction toward the plurality of assembly rails and detachably mounted to the plurality of assembly rails; and
a second roof rail extending in a predetermined shape according to a type of vehicle body, wherein an end portion of the second roof rail is detachably mounted to an end portion of each of the plurality of assembly rails,
wherein each of the plurality of assembly rails comprises a rail groove in an inner side surface of each of the plurality of assembly rails, the rail groove facing the first roof rail and extending in the forward-backward direction,
wherein the first roof rail comprises a flange portion at a respective end portion of the first roof rail, the flange portion extending in the forward-backward direction, and
wherein the flange portion includes a sliding portion protruding to the rail groove.

2. The body roof of claim 1, further comprising a pillar rail disposed under each of the plurality of assembly rails, wherein the pillar rail extends in an upward-downward direction and is detachably mounted to each of the plurality of assembly rails.

3. The body roof of claim 2, wherein the pillar rail comprises:
a pair of side wall portions extending in the upward-downward direction and disposed opposite each other in the forward-backward direction; and
an outer side portion connecting the pair of side wall portions.

4. The body roof of claim 3, wherein the pillar rail comprises a contact portion extending from an upper end of the outer side portion and surrounding an outer side surface of one of the plurality of assembly rails, and
wherein fastening bolts or rivets extend through the contact portion and a respective assembly rail among the plurality of assembly rails such that the contact portion is mounted to the respective assembly rail in a state in which the contact portion is in contact with and surrounds one of the plurality of assembly rails.

5. The body roof of claim 3, wherein the second roof rail comprises a fastening portion extending downwards and then contacting with the side wall portions of the pillar rail, and
wherein fastening bolts or rivets extend through the side wall portions and the fastening portion such that the side wall portions are mounted to the fastening portion in a state in which the side wall portions are aligned with the fastening portion.

6. The body roof of claim 1, wherein fastening bolts or rivets extend through the flange portion of the first roof rail and a respective assembly rail among the plurality of assembly rails such that the flange portion and the respective assembly rail are connected to each other in a state in which the sliding portion is slidably disposed in the rail groove.

7. The body roof of claim 1, wherein the second roof rail includes a plurality of second roof rails, and
wherein the body roof further comprises a support rail disposed between the plurality of second roof rails and extending in the lateral direction toward the plurality of second roof rails so as to be connected to the plurality of second roof rails.

8. The body roof of claim 7, wherein the support rail has a rectangular-shaped cross-section having one open side while each of both ends of the support rail has a shape that is bent outwards.

9. The body roof of claim 7, wherein each of the plurality of second roof rails includes a fixing part on which the support rail is seated, and
wherein the support rail is coupled to each of the plurality of second roof rails via the fixing part such that the support rail is securely coupled to the fixing part in a state of being seated on the fixing part.

10. The body roof of claim 7, wherein each of the plurality of assembly rails includes:
a fitting portion at an end portion of each of the plurality of assembly rails, the fitting portion protruding in a direction in which the plurality of assembly rails extends; and
an insertion portion at an end portion of each of the plurality of second roof rails, the insertion portion facing the end portion of a respective one of the plurality of assembly rails and extending through the fitting portion.

11. The body roof of claim 10, wherein the fitting portion and the insertion portion have a same cross-sectional shape, and
wherein the fitting portion and the insertion portion are securely coupled to each other by fastening bolts or rivets along a circumference of a coupled fitting portion and insertion portion in a state in which the insertion portion is disposed in the fitting portion.

* * * * *